INVENTOR
John C. H. Wendes
By Gourley & Budlong
ATTORNEYS

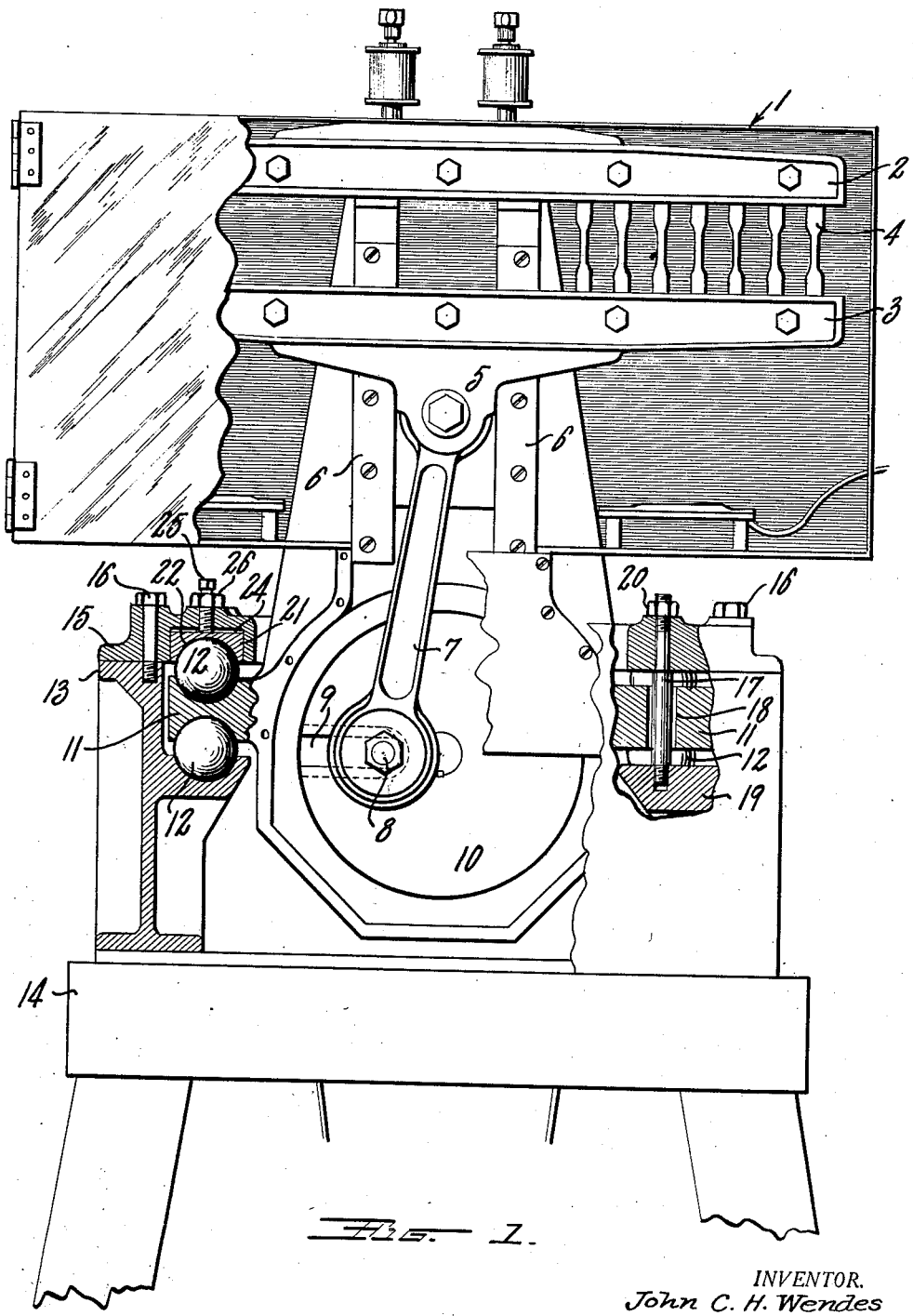

Sept. 5, 1939.   J. C. H. WENDES   2,171,774
VIBRATION DAMPENING DEVICE
Filed Jan. 7, 1937   4 Sheets-Sheet 3
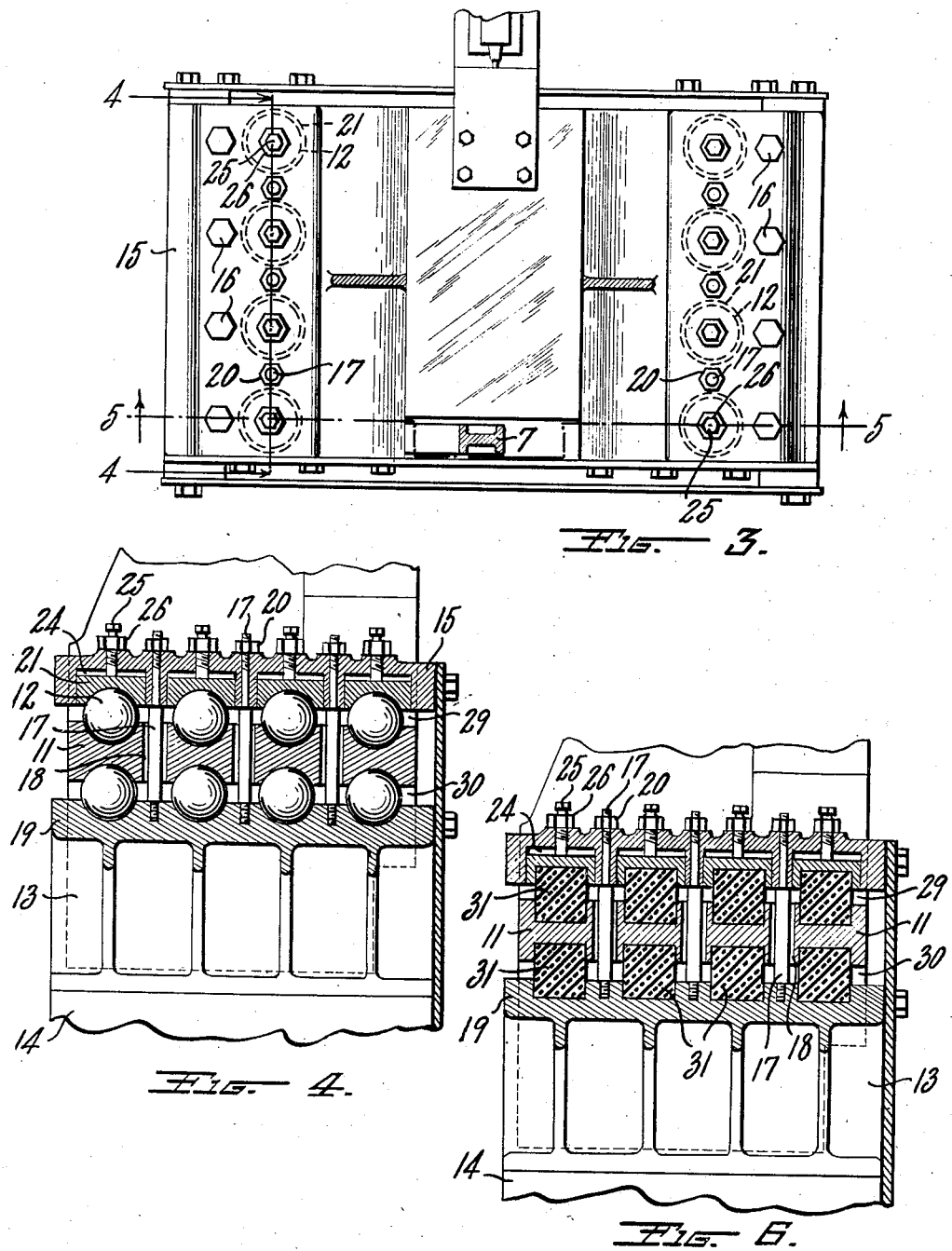

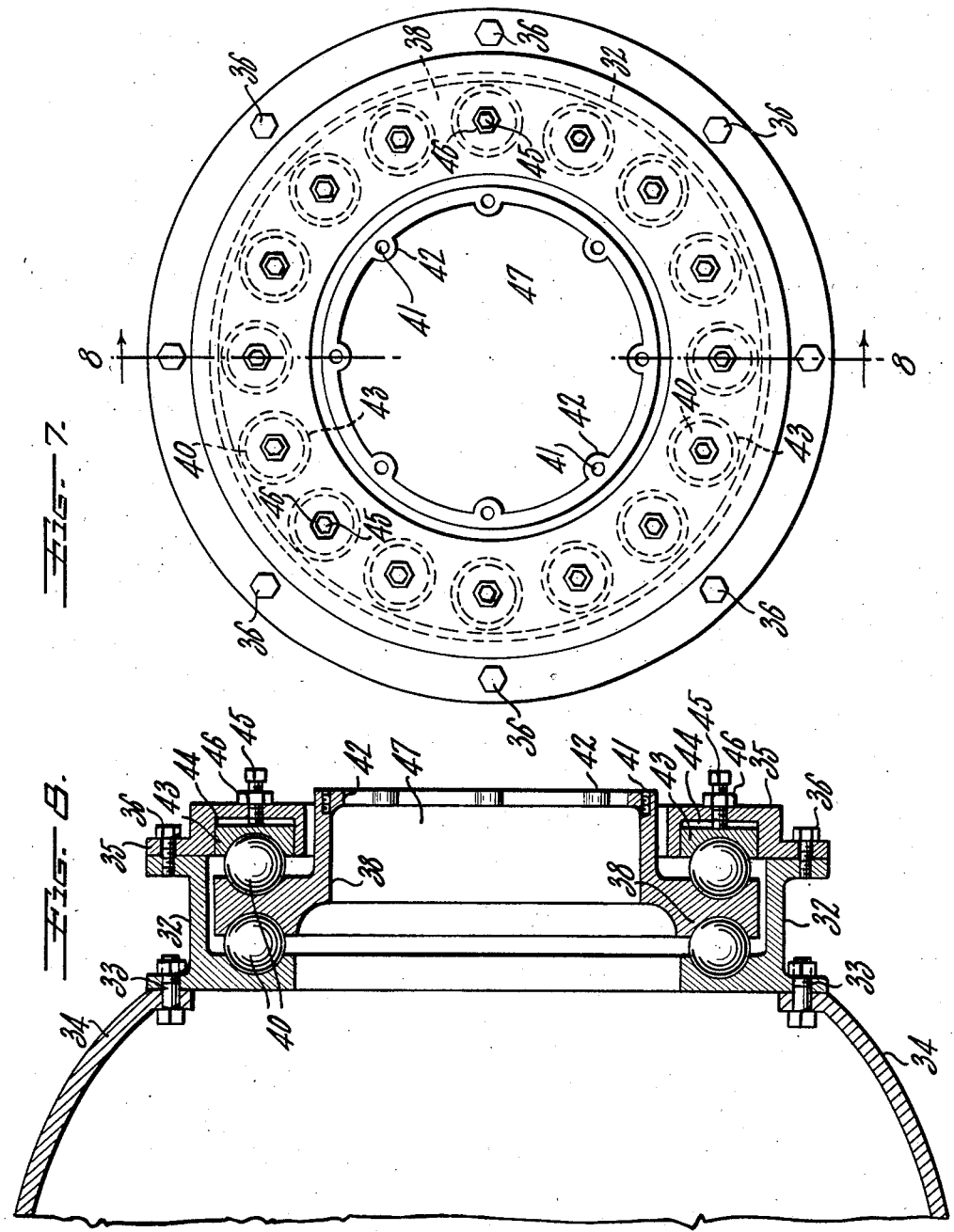

Patented Sept. 5, 1939

2,171,774

UNITED STATES PATENT OFFICE 2,171,774

VIBRATION DAMPENING DEVICE

John C. H. Wendes, Naugatuck, Conn., assignor, by mesne assignments, to United States Rubber Company, New York, N. Y., a corporation of New Jersey Application January 7, 1937, Serial No. 119,432

3 Claims. (Cl. 248—358)

My invention relates to variable resilient vibration dampening devices for use as mountings or supports, and more particularly to separate, slightly deformable, resilient cushioning bodies and variable pressure means for effecting said deformations, which are adapted to dampen vibrations of various magnitudes acting in various directions, such as vertical, horizontal, and torsional. They also prevent transmission of such vibrations and of sounds to bases, floors, stationary members, and the like.

To employ resilient cushioning bodies, partially enclosed, between a vibrating member and a base, for the purpose of dampening shocks, vibrations and noise, is well known. Some applications of this construction will dampen horizontal vibrations, others vertical, and still others vibrations concentrated in a particular direction, or of a particular magnitude or frequency. They will also reduce noise to a certain extent by eliminating metal-to-metal contact between the vibrating member and the base. However, when the vibrations attain a certain frequency, or harmonics thereof, the mountings heretofore known lose their desirable dampening properties since the mounting or mounting assembly itself has a complementary range of sensitive response corresponding to the frequency of vibrations in the vibrating member itself. The result of this natural sensitive frequency range of any solid body or assembly of bodies is that, while such vibration dampening devices may suffice for certain magnitudes, frequencies and directions of vibrations, they are all subject to a reduction of their dampening characteristics when acted upon within their sensitive ranges. This limitation has been inherent in the mountings known heretofore likewise with respect to their inherent ranges of deficiency in absorbing vibrations of different magnitudes. As the position, material, design, and particularly the amount of deformation of the resilient body vary, so will its efficiency fluctuate in absorbing shocks and vibrations according to their magnitude, frequency and direction. It was found in the prior devices that a resilient cushion mounting for an engine, for example, might be highly efficient for high speeds producing high frequencies of vibrations, while at low speeds the vibrations were not completely absorbed but were transmitted to the base which was to be insulated from such noise and motion.

I provide a vibration dampening device in which a plurality of resilient bodies separate and cushion a vibrating member from a base, and in which each resilient body may be separately deformed to a desired degree by controlling a pressure member acting on said body. For purposes of illustrating the construction and operation of this device, the resilient bodies may take the form of rubber balls fitted snugly partway into sockets above and below a vibrating member, with their opposite sides fitted into similar base sockets. The slight deformation of the rubber balls during adjustment and operation takes place in the small spaces between the vibrating member and the base. Slidable members, each operating as an adjustable socket in the base for a rubber ball, are provided to press against the rubber balls and are adjustable at will from the outside of said base. By varying the position of one or more of these slidable pressure members, and thus varying the pressure against the rubber balls, the amount of deformation of the balls may be regulated, to support any desired load and to overcome harmonic vibrations.

My device, having means for adjusting separately the pressure against each resilient body, will dampen vibrations of practically any frequency, magnitude or direction whatsoever. As a plurality or multiplicity of resilient bodies is employed, and the deformation or vibration-dampening characteristics of each body may be separately altered, it is obvious that the aggregate of combinations of adjustments for the whole device is infinite, within the bounds of the shape and properties of materials used in the resilient cushioning bodies. These limits may be enlarged by removing the bodies from the sockets and substituting bodies of different materials having different shock-absorbing characteristics.

Since the resilient bodies employed in my invention are practically entirely enclosed except for the space between the vibrating member and the base, horizontal or lateral vibrations are effectively dampened, as the space is limited in which the elasticity or resiliency of the body may have some freedom of play. The unenclosed portion of each resilient body lying between the planes defining said space is interiorly and exteriorly unsupported in the direction of lines lying between and extending parallel to said planes. By increasing the pressure against the body or bodies within the socket, as I have provided and as will appear more fully in the detailed description to follow, the dampening effect of such a particular body or bodies on the vibrating member will be augmented, since the elastic characteristic of the body or bodies has been reduced. Similarly, a diminution in the pressure against a resilient body tends to decrease the dampening effect of that particular body. By similar adjustments of one or more bodies in any device, vertical dampening effects may be controlled, so as to effectively dampen vertical vibrations of various magnitudes and frequencies.

Hence torsional vibrations, or those having both horizontal and vertical components will also be controlled by like adjustments. In such a case, those bodies in the areas where the horizontal components are greater may be adjusted to different degrees of pressure from those wherein the vertical components are greater. It will be apparent that vibrations in all directions may be controlled by such adjustments preferably when multiple layers of the resilient bodies are arranged in systematic relationship.

In the case of harmonic vibrations, one or more bodies may be adjusted to break the effect thereof. The adjusting means are easily accessible so that adjustments may be made at any time, prior to or during the vibratory motion of the vibrating member. They may be made individually or collectively and may be varied at will as conditions vary.

By the elimination of metal-to-metal contact, noises set up in the vibrating member, as well as those tending to arise in the device itself, are prevented from being transmitted to the base or stationary parts. Shocks are absorbed, with like results, when the pressure members acting against the resilient bodies are severally properly adjusted.

Accordingly, the present invention provides for separate adjustment of individual units of a plurality of resilient bodies collectively constituting the support for the vibrating body, whereby the vibration dampening characteristics of the entire group of said bodies may be collectively or singly controlled to absorb vibrations of various directions, magnitudes, frequencies, forces and various combinations thereof.

The vibration dampening device embodied in my invention has a great number of applications. My invention may be employed to dampen vibrations in all types of reciprocating machines, such as passenger automobile motors, truck motors, motorboat engines, airplane engines, and the like. Also it is of great value and high efficiency in stationary engines, which cause vibrations and noises and tend to transmit them to buildings, such as air compressors, vibratory screens, looms, printing presses, and rubber machinery such as mixing mills, refiners, calenders, and the like. An embodiment of the invention may be incorporated into radial types of machinery such as fans, airplane motors, and the like.

The accompanying drawings illustrate certain present preferred embodiments of the invention, in which:

Fig. 1 is a front elevational view of a flexing machine, with portions broken away, embodying the invention;

Fig. 3 is a plan view thereof;

Fig. 4 is a cross-sectional view taken along the section line 4—4 of Fig. 3;

Fig. 6 is a sectional view corresponding to Fig. 4 showing a modified form of the invention;

Fig. 7 is a plan view of a modified form of vibration dampening device; and

Fig. 8 is a cross-sectional view thereof taken along the section line 8—8 of Fig. 7, and also showing a portion of a supporting base.

Figure 5:
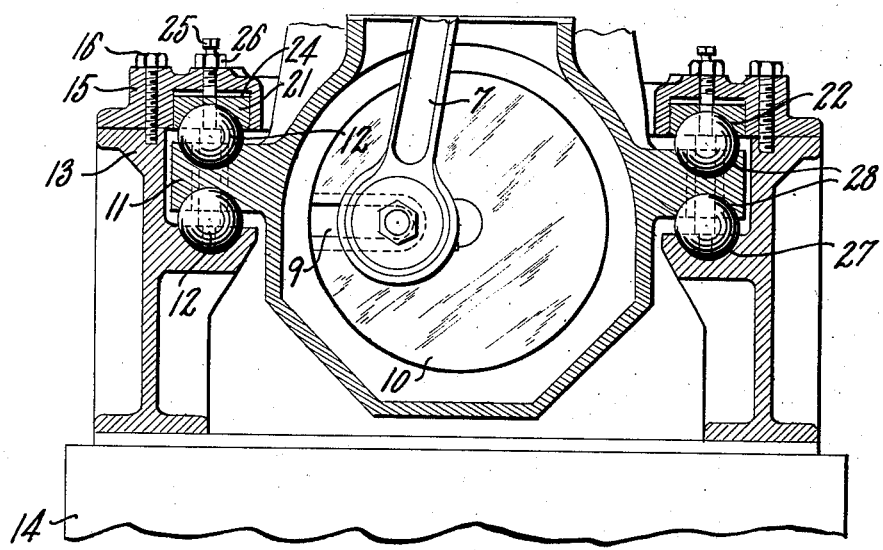
Fig. 5 is a cross-sectional view taken along the section line 5—5 of Fig. 3.
Figure 2:
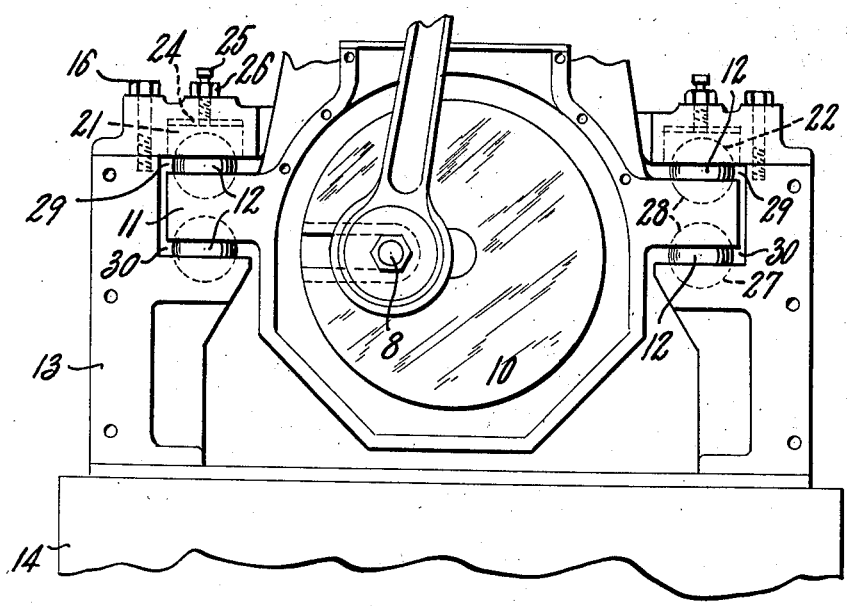
Fig. 2 is a front elevational view of the vibration dampening device.

Referring to the drawings, and particularly to Figs. 1–5, the present invention is embodied in a flexing machine 1 having a stationary plate 2 and a reciprocating plate 3 for bending pieces of rubber 4. The plate 3 is mounted on a slidable base 5 which moves vertically between guides 6 as it is driven by a connecting rod 7 which, in turn, is pivoted to a pin 8 which may be variably anchored in slot 9 in propelling wheel 10 to constitute a crank. The wheel 10 may be powered by any desired means. This reciprocating assembly is mounted on a supporting member 11 which vibrates when the machine is in operation. Vibrating member 11 is supported by resilient spheres 12, preferably of rubber, which separate it from a base 13 which, in turn, may be mounted on a framework 14. The base 13 is provided with a removable head 15 which is secured thereto by bolts 16 and also by stud bolts 17 extending in spaced relationship through larger holes 18 in the vibrating member, and seating in the protruding shell 19 of the base 13 and capped with nuts 20. The head 15 seats a plurality of pressure members 21, each having a socket 22, which is adjustable in a pocket 24 in the head 15 by a bolt 25 secured by lock-nut 26. The resilient spheres 12 fit partially into the conforming sockets 22 in the pressure members 21 and into complementary sockets 27 in the base and into cooperating sockets 28 in the vibrating member, so that an upper space 29 and a lower space 30 are left between the base assembly and the vibrating member.

Referring to Figs. 1–5 it is clear that the supporting member 11 supports a reciprocating assembly in which the stroke may be varied by adjusting the pin 8 in different positions in the slot 9. This assembly produces vibrations in the member 11. As the speed of the wheel 10 and the stroke of the connecting rod 7 are varied, so will the frequency, magnitude and to a certain extent the direction of vibrations vary when transmitted to the member 11. The member 11 is maintained in position entirely by the resilient spheres 12, which, in turn, are supported firmly in place by the base 13 and the corresponding sockets 22, 27 and 28. No part of the vibrating member 11 can touch the base assembly as they are separated by the spaces 29 and 30. In addition, the stud bolts 17, which connect the base-head 15 with the base to aid in forming a rigid base assembly, cannot come in contact with the vibrating member 11 through which they pass, since the holes 18 in the vibrating member to permit such passage are substantially larger than the shank of said bolts 17. Thus are provided two independent systems, one oscillatory and one stationary, which are connected and normally positioned relative to each other entirely by a plurality of resilient bodies. This construction prevents the transmission of vibrations, noises and shocks from one system to the other.

The resilient bodies 12 employed in my vibration dampening device may be of any resilient material, such as vulcanized or unvulcanized crude, reclaim or sponge rubber, halogenated rubber, artificial rubber, synthetic rubber-like material such as neoprene, "Thiokol", "A—X—F", "Vistanex" and the like, or cork or similar materials having resilient properties. They are preferably solid, but may take a hollow form, and be hermetically sealed or not as desired, e. g., as pneumatic rubber balls.

While Figs. 1-5 represent these bodies as having a spherical shape, they may be blocks of any desired shape, and may have circular, oval, square or rectangular cross-section, as desired. The shape of the sockets 22, 27 and 28 must conform to the shape of that part of the bodies which they enclose.

When the bolts 25 are tightened, the pressure members 21 exert a pressure against the resilient bodies 12, so that they may be deformed slightly in spaces 29 and 30. It is preferable to minimize such deformation, however, by utilizing a suitable number of resilient bodies in relation to the weight of the vibrating member and composition of said resilient bodies. This increased pressure against the body reduces the resiliency and increases the rigidity thereof, so that vibrations of greater magnitude and frequency may be dampened without allowing too much motion of the vibrating member to take place in the space surrounding it. Such a tightening adjustment, by dampening stronger vibrations, will prevent their transmission to the base which is to be insulated therefrom. Conversely, when the bolts 25 are turned in the opposite direction, the pressure members 21 will be forced upward in the pockets 24 by the resiliency of the spheres 12. The spheres are then held less rigidly and are better adapted to absorb weaker vibrations.

Although Figs. 1-5 show a specific form of pressure member operated by an adjusting bolt, any suitable means for changing the pressure exerted against the resilient bodies, such as a clamping device, may be employed. The adjusting parts, however, are preferably accessible from the exterior of the assembly, to permit ready adjustment, whether the member 11 is in operation and vibrating or not. The base head 15 is readily removable by unfastening the bolts 16 and the nuts 20 so that resilient bodies having different elastic properties may be substituted.

Accordingly, the pressure against the resilient bodies to control their deformation may be individually or collectively controlled by turning one or more bolts 25. Referring to Fig. 1, clockwise revolutions of the driving wheel 10 will tend to depress the right end of member 11 and to raise the left end thereof, so that torsional vibrations will take place in addition to those produced by the vertical motions of the plate 3. By relative adjustments of the bank of bolts 25 on the left side with respect to those on the right side, the torsional vibrations may be dampened by the complementary absorbing action of said oppositely positioned banks. Referring now to Fig. 3, under the same conditions, i. e., where both vertical and torsional vibrations are to be dampened, the adjustments of bolts 25 may be made so that the pair of bolts through which the section line 5—5 extends and the corresponding pair at the rear of the device may be relatively adjusted to provide absorption of torsional vibrations and to interfere with harmonics thereof. The intermediate bolts may similarly be adjusted to press against the balls 12 in proper manner to absorb and dampen vertical vibrations and to interfere with harmonics thereof. Similarly adjustments may be made to provide effective dampening of vibrations of any magnitude, frequency, or direction.

The parallel arrangement of the layers and rows of resilient spheres is shown in Figs. 1-5, in order that whatever the direction of the vibrations, each body may have at least one other to compensate for its vibration absorbing action when the direction of the vibrations is in a plane running through both of said bodies. However, other desired arrangements of said bodies, such as circular or of other configurations, may be employed as desired when used in any specific construction. Instead of two layers of resilient bodies more may be employed. With such multiple construction either one or more vibrating members may be supported.

When employed in a flexing machine, as shown in Figs. 1-5, the present invention has proven entirely satisfactory. Fifty to one hundred strips of rubber 4 were attached between plates 2 and 3 and the machine was started in operation. Spheres two and one-eighth inches in diameter, of vulcanized rubber similar in composition to tire tread stock, were employed as the resilient bodies 12. It was estimated that each ball would hold approximately 1000 pounds without undue deformation. From time to time strips of rubber 4 being tested broke with considerable violence, accompanied by shocks of comparatively great amplitude. When the bolts 25 were properly adjusted, the mounting device prevented the transmission of these shocks and all vibrations and noise to the base, floor and parts of the room, and reduced noise to a minimum.

Referring now to Fig. 6, the resilient bodies 31 are shown as having a rectangular cross-section instead of the spherical shape above described. The sockets into which they fit conform to the shape of the bodies themselves.

In Figs. 7 and 8 there is shown a radial mounting, comprising a base 32 which may be secured by bolts 33 to a framework or stationary member 34 such as a fuselage. A removable base-head 35 is attached to said base 32 by bolts 36. A vibrating member 38, supported by spheres 40 and spaced thereby from the base 32 and the base-head 35, is provided with bolt holes 41 in lugs 42 for holding a vibrating body, such as a fan, an airplane motor or the like. In the base-head 35 are slidably mounted pressure members 43 which move in pockets 44 when adjusted by bolts 45 secured by lock nuts 46. Through the space 47 lead wires and pipes may enter, or air may be circulated.

By tightening bolts 45, the pressure members 43 will be pressed against the resilient bodies 40 so that their vibration dampening characteristics may be altered singly or collectively. According to the adjustments made, vibrations of all directions, frequencies and magnitudes may be controlled.

In the several forms of the present invention herein described and illustrated, a vibrating member is separated from a base by a plurality of resilient bodies and means are provided for varying the pressure on each body so as to control its initial and ultimate deformation and hence its vibration dampening characteristics. This pressure against the bodies may be varied individually and collectively so that vibrations, shocks and noises will not be transmitted from the vibrating member to the base. These adjustments may be made to dampen vibrations of various frequencies, magnitudes and directions or various combinations thereof.

It will be obvious to any one skilled in the art that the position of the parts may be reversed so that the supported member is stationary and the supporting base is vibrating. This construction may be utilized in supporting railroad car and automobile seats, cushions, and the like.

While I have shown and described certain preferred embodiments of my invention, it is to be understood that it may be otherwise embodied within the spirit of the invention and the scope of the appended claims.

Having thus described my invention, what I claim and desire to protect by Letters Patent is:

1. A vibration dampening device comprising an annular base having substantially a C-shaped cross-section defining a channel in the interior face thereof, a vibrating member extending into said channel, a plurality of resilient bodies which separate said vibrating member from said base by a space, said bodies having unenclosed portions lying between planes defining said space, said unenclosed portions being interiorly and exteriorly unsupported in the direction of lines lying between and extending parallel to said planes and variable pressure means adjustably mounted within the wall of said base and movable therein only transversely with respect to said vibrating member, for separately controlling the vibration absorbing capacity of each of said bodies whereby vibrations of various magnitudes, frequencies and directions may be dampened.

2. A vibration dampening device comprising a base substantially C-shaped in cross-section throughout its length, the upper inner surface of said base having a plurality of pockets, each pocket having a socket slidable therein only in a vertical direction, the lower inner surface of said base having sockets formed therein and oppositely positioned with respect to said adjustable sockets, a vibrating member extending between said upper and lower surfaces and having sockets formed in the member and matching with said sockets in the base to constitute upper and lower pairs of sockets, a plurality of separate resilient bodies whose surfaces enclose resilient material only, said bodies fitting within said upper and lower pairs of sockets and separating said base from said vibrating member by a space, said bodies having unenclosed portions lying between the planes defining said space, said unenclosed portions being interiorly and exteriorly unsupported in the direction of lines lying between and extending parallel to said planes, and means for vertically adjusting each upper socket within its pocket.

3. A vibration dampening device comprising a base defining a channel in one side, said base having a plurality of pairs of oppositely positioned sockets seated within the base on the opposite sides of said channel, at least one socket of each pair being movable within said base transversely only to said sides of the channel, a vibrating member extending into said channel substantially throughout the length of said channel, a plurality of sockets formed in said vibrating member similar to and matching with the sockets in said base to constitute pairs of sockets, a plurality of separate resilient bodies fitting snugly within said pairs of sockets and separating said base from said vibrating member by a space, said bodies having unenclosed portions lying between the planes defining said space, said unenclosed portions being interiorly and exteriorly unsupported in the direction of lines lying between and parallel to said planes, and means for moving each movable socket within the base transversely to said opposite sides of the channel.

JOHN C. H. WENDES.